United States Patent [19]

Lee

[11] Patent Number: 4,813,038

[45] Date of Patent: Mar. 14, 1989

[54] NON-BLOCKING COPY NETWORK FOR MULTICAST PACKET SWITCHING

[75] Inventor: Tony T. Lee, Bridgewater, N.J.

[73] Assignee: Bell Communications Research, Inc., Livingston, N.J.

[21] Appl. No.: 68,197

[22] Filed: Jun. 29, 1987

[51] Int. Cl.$^4$ .............................................. H04J 3/26
[52] U.S. Cl. .......................................... 370/60; 370/94
[58] Field of Search ........................ 370/58, 60, 62, 64, 370/94, 85, 104, 89; 340/825.5

[56] References Cited

U.S. PATENT DOCUMENTS

| | | | |
|---|---|---|---|
| 4,317,195 | 2/1982 | Barberis et al. | 370/60 |
| 4,354,263 | 10/1982 | Bordry et al. | 370/60 |
| 4,542,497 | 9/1985 | Huang et al. | 370/60 |
| 4,617,657 | 10/1986 | Drynan et al. | 370/60 |
| 4,734,907 | 3/1988 | Turner | 370/60 |

FOREIGN PATENT DOCUMENTS 8404015 10/1984 World Int. Prop. O. ............ 370/60

OTHER PUBLICATIONS

A. Huang and S. Knauer, "Starlite: A Wideband Digital Switch," Proceedings of Globecom 84, pp. 121–125.

Primary Examiner—M. H. Paschall
Attorney, Agent, or Firm—James W. Falk

[57] ABSTRACT

A copy network capable of packet replication is disclosed. An encoding process transforms the set of copy numbers, specified in the headers of incoming packets, into a set of monotone address intervals which form new packet headers. This process is carried out by a running adder network and a set of dummy address encoders. A broadcast banyan network performs the packet replication according to a Boolean Interval Splitting Algorithm. Finally, trunk number translators determine the destinations of individual copies. The copy network is self-routing, non-blocking and has a constant packet latency.

35 Claims, 11 Drawing Sheets

NON-BLOCKING COPY NETWORK FOR MULTICAST PACKET SWITCHING

FIELD OF THE INVENTION

The present invention relates to a non-blocking self-routing copy network for copying data packets.

BACKGROUND OF THE INVENTION

One goal of a broadband packet network is to provide a flexible system capable of handling multipoint or broadcast connections in addition to point-to-point connections. A wide class of applications, such as teleconferencing, entertainment video, local area network (LAN) bridging and distributed data processing require multipoint connections. Thus, an important component of a broadband packet network is a packet switch capable of packet replication and switching. Such a packet switch is referred to herein as a multicast packet switch.

A multicast packet switch is usually a serial combination of a copy network which replicates incoming packets and a point-to-point switch which routes the packet copies generated in the copy network to particular destinations. The concern herein is primarily with copy networks.

One example of a copy network is disclosed in Huang, A. and Knauer, S., "Starlite: A Wideband Digital Switch" Proceedings of Globecom 84 121-125. The copy network in this system (which is known as the Starlite System) is receiver initiated. The inputs to the copy network are original source packets and empty packets generated by receivers. Thus, for example, if a total of four copies of a packet from a given source are required, the original source packet and three empty packets containing the same source address are provided at the inputs to the copy network.

The copy network of the Starlite System comprises a sorting network and a broadcast network. Both of these networks comprise regularly interconnected identical switching nodes which are self-routing (i.e. routing decisions are made based on information contained in the packet headers). Initially, the sorting network sorts the input packets according to source address. Thus, at the outputs of the sorting network, the original source packets and the associated empty packets with the same source address appear contiguously. The broadcast network then replicates the data in each source packet and inserts this data into the data fields of the associated empty packets.

In the Starlite copy network, the process of packet replication requires synchronization of the sources and receivers and requires an "empty packet setup procedure". These are the main drawbacks of the Starlite copy network. It would be difficult to implement the Starlite copy network as part of a broadband packet network wherein packets experience variable delays due to buffering, multiplexing and switching in a multi-hop connection.

Another example of a copy network is disclosed in U.S. patent application Ser. No. 773,380 entitled Broadcast Packet Switching Network and filed for Jonathan Turner on Sept. 6, 1985 now issued as U.S. Pat. No. 4,734,907 Mar. 29, 1988. The Turner copy network employs a self-routing banyan network formed from regularly interconnected identical switching nodes and a set of memories known as broadcast and group translators (BGT's). The header of an input broadcast packet contains two fields, a copy number (CN) indicating the required number of copies of the packet and a broadcast channel number (BCN) used by the broadcast and group translators. Packets are replicated in the banyan network using an algorithm which involves splitting the copy number evenly. Using the table lookup method, trunk number translation is performed by the broadcast and group translators when packet copies appear at the outputs of the banyan network. Then the packet copies are routed to the appropriate destinations by a succeeding routing network. Packet collisions cannot be avoided in the banyan network used to replicate packets in the Turner patent application, i.e. the banyan network disclosed in the above-identified patent application is blocking. This means that two packets may arrive at a particular node simultaneously and attempt to leave on the same output link at the same time. Thus, each node has a complex design including buffers to prevent packet loss. Because of the buffers, the latency (i.e. the packet propagation time in the network) varies from packet to packet. In addition, the carried load of this copy network depends in part on the total number of copies requested, but this information is unknown a priori to the network since packet replication is a divergent branching process. As a result, the performance of the Turner copy network may be difficult to predict and control.

In view of the above, it is an object of the present invention to provide a non-blocking self-routing copy network with constant packet latency.

SUMMARY OF THE INVENTION

The present invention is a non-blocking, constant latency self-routing copy network for use in a multicast packet switch.

The main purpose of the copy network is packet replication. In accordance with an illustrative embodiment of the invention, packet replications are accomplished by an encoding process followed by a decoding process. The encoding process transforms the copy number (i.e. the number of copies required) in the header of each incoming packet into an address interval. Each address interval comprises a continuous group of output addresses defined by a maximum address and a minimum address. The number of addresses in the interval is equal to the original copy number in the incoming packet header. This encoding or transformation process is carried out using a running adder network and a set of dummy address encoders.

A broadcast network such as a self-routing broadcast banyan network comprising an interconnected array of identical switching nodes is used for the decoding or packet replication process. Each node in the broadcast banyan network has two inputs and two outputs. A Boolean Interval Splitting Algorithm is used at each node to decide whether to route an incoming packet to one or both outputs. As a result of the Boolean Interval Splitting Algorithm, each packet is routed to every banyan network output address in the address interval derived as a result of the encoding process. Finally, the actual destinations of packet copies leaving the broadcast banyan network are determined by trunk number translators located at the outputs of the broadcast banyan network. The broadcast banyan network is non-blocking if its inputs are concentrated and the output addresses are assigned monotonically to the inputs. This means that packet buffering is not required at the individual switching nodes.

DETAILED DESCRIPTION OF THE INVENTION

1. Overview of the Inventive Copy Network

Figure 1:
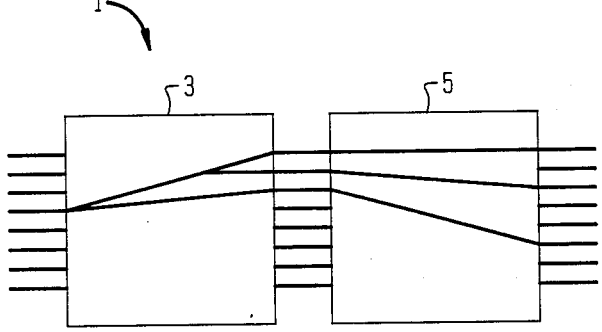
FIG. 1 schematically illustrates a multicast packet switch.

Turning to FIG. 1, a multicast packet switch 1 capable of both packet replications and switching is illustrated. The multicast packet switch 1 comprises a copy network 3 and a point-to-point routing network 5. Each packet processed by the copy network 3 and point-to-point routing network 5 comprises a header followed by data. The copy network 3 replicates input packets from various sources simultaneously, and then, copies of packets emerging from the copy network 3 are routed to their final destinations by the point-to-point routing network 5. The present invention is concerned primarily with the copy network portion of the multicast packet switch and more particularly with a self-routing, non-blocking, constant latency copy network.

Figure 2:
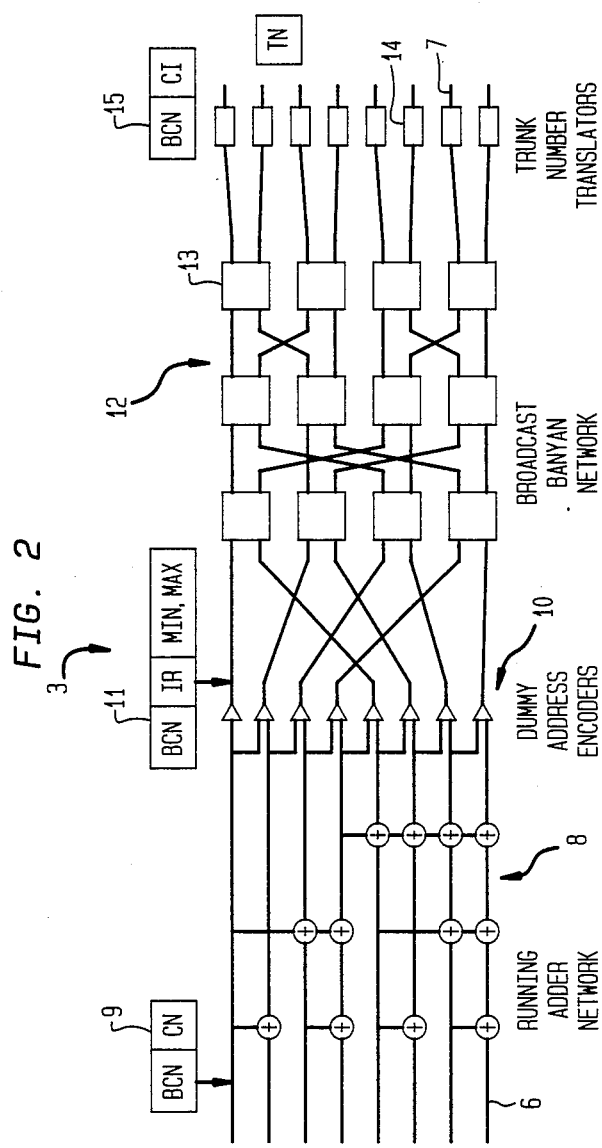
FIG. 2 schematically illustrates a copy network in accordance with an illustrative embodiment of the present invention, FIG. 3 schematically illustrates a conventional banyan network whose nodes utilize a self-routing algorithm, FIG. 4 schematically illustrates a banyan network whose nodes utilize a generalized self-routing algorithm that enables packet replication.

A copy network 3, in accordance with a specific embodiment of the present invention, is schematically illustrated in FIG. 2. The copy network 3 receives input packets on input lines 6 and produces a required number of copies on output lines 7. The header 9 of each incoming packet includes a broadcast channel number (BCN) and a copy number (CN) which indicates the total number of copies of the packet required. The copy network 3 comprises:

1. A Running Adder Network (RAN) 8 for generating running sums of copy numbers (CN) specified in the headers 9 of the input packets, 2. Dummy Address Encoders (DAE's) 10 for taking adjacent running sums to form new packet headers 11, which new packet headers 11 include an address interval defined by a minimum address (MIN) and a maximum address (MAX) as well as an index reference (IR) set equal to the minimum address (MIN), 3. A Broadcast Banyan Network (BBN) 12 comprising an array of interconnected identical nodes 13 for performing packet replications so that each packet is routed to the broadcast banyan network output addresses contained in its associated address interval (MIN, MAX), and 4. Trunk Number Translators 14 for determining the outgoing trunk number or destination address of each packet copy emerging from the broadcast banyan network based on the broadcast channel number (BCN) and copy index number (CI). The copy index number (CI) is calculated using the index reference (IR) and banyan network output address of the packet.

When packets to be broadcast to a plurality of destinations are received at the inputs 6 to the running adder network 8, the copy numbers (CN) in the packet headers 9 are added recursively. In the case of a top down running adder network, this means that each line of the running adder network sums the copy number of the packet received on it with the copy numbers of the packets received on the lines above it. The dummy address encoders 10 utilize the recursive sums produced by the running adder network 8 to replace the copy number (CN) field in each packet header 9 with two new fields: a dummy address interval and an Index Reference (IR). The dummy address interval comprises broadcast banyan network output addresses and is represented in FIG. 2 by two binary numbers, the minimum (MIN) and maximum (MAX). The number of Boolean addresses in the address interval MIN, MAX is equal to the original copy number. The index reference (IR) is set equal to the minimum of the address interval (MIN) and is used by the trunk number translators 14 to determine the copy index (CI).

The broadcast banyan network 12 replicates packets according to a Boolean interval Splitting Algorithm based on the address intervals in the new headers 11. This algorithm insures that a copy of the packet is routed to each broadcast banyan network output address in the address interval MIN, MAX. When packet copies finally appear at the output addresses of the broadcast banyan network, the trunk number translators 14 compute the copy index (CI) for each packet from the packet output address and index reference (IR). The copy index (CI) replaces the index reference (IR) and address interval in the packet headers 15 as shown in FIG. 2. The broadcast channel number (BCN) together with the copy index (CI) form a unique identifier for each packet copy. The trunk number translators 14 then translate this identifier into a trunk number (TN) which is used by the point-to-point switch network 5 (see FIG. 1) to route each packet to its final destination.

2. The Conventional Point-to-Point Banyan Network

Before discussing the copy network of the present invention in detail, it may be helpful to briefly review the operation of a conventional point-to-point banyan network.

A conventional banyan network is an nxn (i.e. n-input, n-output) switch with $N=\log_2 n$ stages. Each stage contains n/2 nodes and each node has two inputs and two outputs, an uppermost or logic "0" output and a lowermost or logic "1" output. The banyan network has been used as a point-to-point switch based on the well known self-routing algorithm. The header of each incoming packet to be routed by the conventional banyan network contains an N-bit destination address. A packet arriving at one of the inputs of a node in the $k^{th}$ stage of the banyan network is sent out via the "0" or "1" output depending on whether the bit $k^{th}$ of the address in the packet header is a logic "0" or logic "1". Because of the topology of the banyan network, this self-routing network enables a packet with a specific output address in its header to be routed through the banyan network to that specific output address.

A point-to-point banyan network 20 comprising four stages k=1,2,3,4 is shown in FIG. 1. The banyan network 20 comprises an interconnected array of identical nodes 22 with each node having two inputs 24 and two outputs 26. The uppermost output of each node corresponds to logic "0" and the lowermost output of each node corresponds to logic "1".

Each of the inputs 28 to the banyan network 20 has a Boolean address, which addresses range from 0000 to 1111. Similarly, the outputs 30 of the network 20 have Boolean addresses ranging from 0000 to 1111. It should be noted that the inputs 28 of the banyan network 20 are connected to the inputs 24 of the nodes in stage k=1 by means of a connection pattern known as a perfect shuffle. Thus, for example, the input line bearing the address 0010 is connected to the uppermost input of the third node from the top in the stage k=1.

Figure 3:
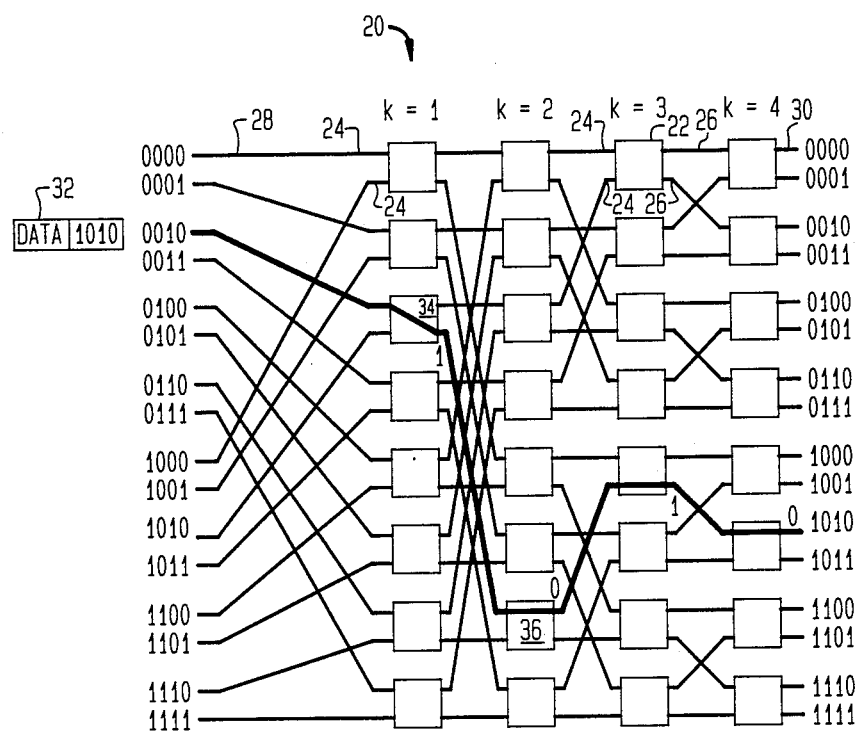

The self-routing property of the banyan network 20 may be understood in connection with the following example. A packet 32 arrives at the input line 0010 having the output address 1010 in its header. The path this packet follows through the self-routing banyan network 20 is indicated by the heavy line in FIG. 3. This packet is routed to the node 34 in the stage k=1 of the network 20. Since the bit in the k=1 position of the address in the packet header is a "1", the packet is routed to the lowermost output of this node. Similarly, since the bit in the k=2 position of the address in the packet header is logic "0", the node 36 in the k=2 stage of the banyan network 20 routes the packet to its uppermost output. In this way, the packet is routed through the point-to-point banyan network 20 to the output address 1010.

The banyan network itself is a blocking network. This means that two packets with different destination addresses may be routed through the same internal link at the same time, thereby causing one or both packets to be lost. However, it is known that if the incoming packets are arranged in ascending or descending order according to destination address, and any input between two active inputs is also active, then the banyan network becomes non-blocking. Thus, a non-blocking network may by realized by combining a Batcher sorting network with a banyan network. The Batcher sorting network sorts the incoming packets according to their destination addresses and the banyan network routes the packets to these destinations. (See, e.g. the routing network of the Starlite System discussed above).

3. Generalized Self-Routing Algorithm

A broadcast banyan network has the same topology as the point-to-point banyan network discussed above (i.e. the nodes have the same interconnection pattern) except that the algorithm executed at the individual nodes enables packet replication when appropriate. Thus, a packet arriving at each node in a broadcast banyan network can be routed to the upper (i.e. the "0") output to the lower (i.e. the "1") output or to both outputs. Since the decision to be made at each node has three possible outcomes, the minimum header information required by each switching node to make the decision is two bits.

Figure 4:
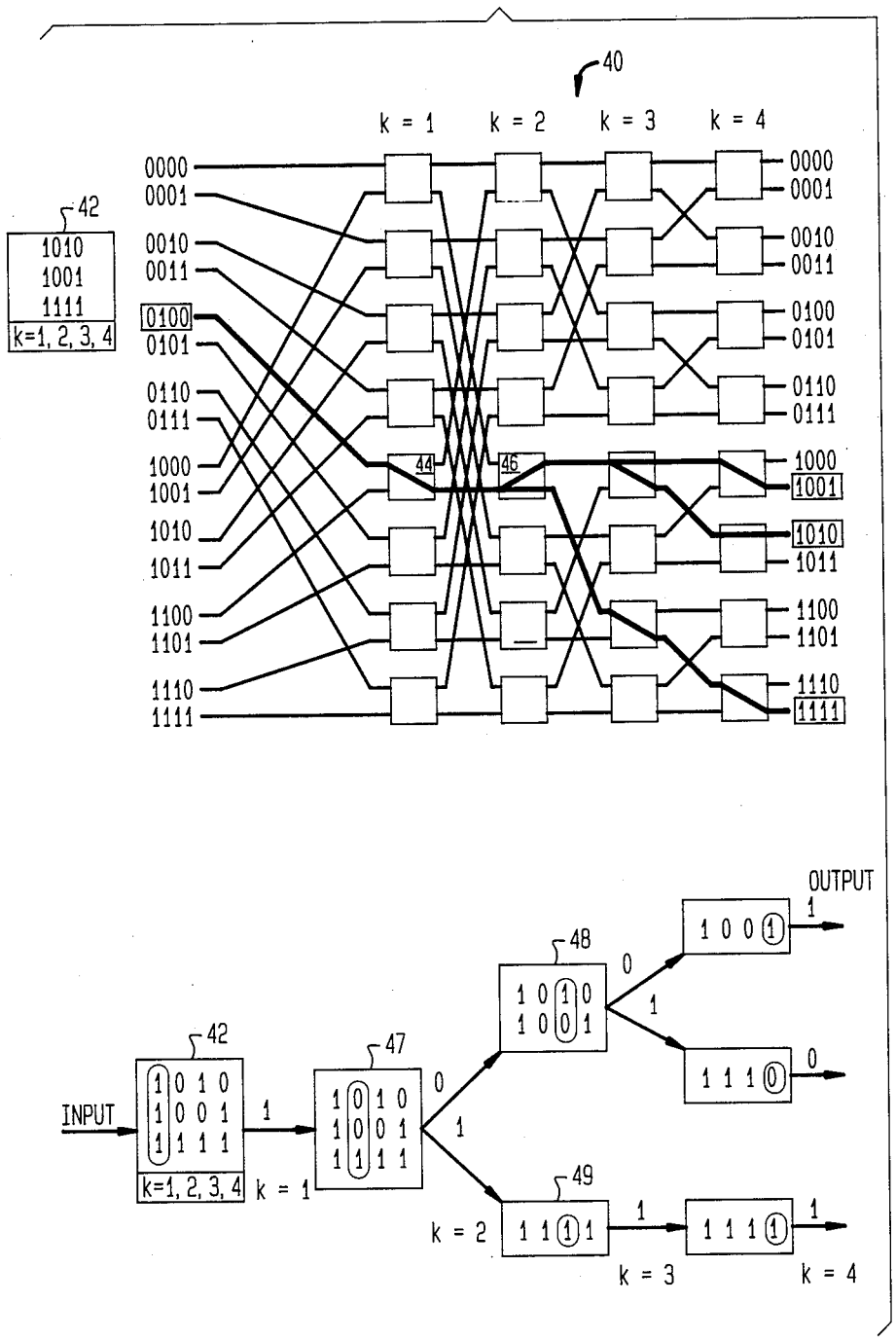

FIG. 4 schematically illustrates a generalization of the above-described self-routing algorithm to the situation where an input packet is to be self-routed to multiple addresses. Illustratively, an incoming broadcast packet (i.e. a packet to be broadcast or distributed to multiple addresses) contains a set of arbitrary N-bit destination addresses (where N is the number of stages in the network). Suppose a node at stage k of the broadcast banyan network receives the packet. The routing decision to be made by that node is determined by the $k^{th}$ bit of all the destination addresses in the packet header. If the $k^{th}$ bit in all of the addresses is logic "0" or logic "1" then the packet will be sent out from the logic "0" or logic "1" output, respectively, and no replication takes place. Otherwise the packet is replicated and the packet is sent out on both outputs. When the packet is sent out on both outputs, the following header modification take place. The header of the packet copy sent out on the "0" output contains only those addresses from the packet header entering the node whose $k^{th}$ bit is equal to "0". Similarly, the header of the packet sent out on the "1" output contains only those addresses whose $k^{th}$ bit is equal to "1". This modification of packet headers is performed by the appropriate node whenever packet replication takes place.

In FIG. 4, an example of the generalized self-routing algorithm is illustrated in connection with a broadcast banyan network 40. A broadcast packet 42 containing the destination addresses 1010, 1001, and 1111 is received at the network input having the address 0100. A copy of this packet emerges from the broadcast banyan network 40 of FIG. 4 on the output lines bearing the addresses 1010, 1001, and 1111. The path of the broadcast packet through the broadcast banyan network is indicated in FIG. 4 by the heavy lines.

The k=1 bit position in each of the three destination addresses is "1"; thus, in the k=1 stage of the network, the packet is routed to the "1" output of the node 44. There is no packet replication and no header modification in the packet 47 leaving the node 44. The k=2 bit positions of the addresses contain both "0"'s and "1"'s. Thus, packet replication takes place at the node 46 in the network stage k=2. Accordingly, the broadcast packet emerges from the node 46 on both the "0" and "1" outputs. However, packet header modification takes place so that the header of the packet 48 leaving on the "0" output contains only addresses whose k=2 bit position is "0" and the header of the packet 49 leaving on the "1" output of the node 46 contains the one address having a "1" in the k=2 bit position. The generalized self-routing algorithm is followed in the k=3 and k=4 stages of the network of FIG. 4 so that packet copies emerge at the appropriate output addresses.

There are several problems which may arise in the practical implementation of the generalized self-routing algorithm discussed above. First, the packet headers contain variable numbers of addresses which have to be read and processed by the switching nodes. In particular, the process of packet header modification is a burden on the switching nodes. In addition, a broadcast banyan network which utilizes the above-described generalized self-routing algorithm is blocking. These problems are due to the irregularity in the sets of destination addresses in the packet headers. Fortunately, these problems can be avoided if the set of broadcast banyan network output addresses, to which packet copies are to be routed, are delineated by an address interval rather than an explicit list of addresses. The use of an address interval instead of an address list creates no problem since broadcast banyan network output addresses are fictitious and used only for copying and not for point-to-point routing to actual addresses. The broadcast banyan network is followed by trunk number translators which provide packet copies with trunk numbers. A point-to-point routing network then routes the packets to the actual destination addresses indicated by the trunk numbers.

4. Boolean Interval Splitting Algorithm

Figure 5:
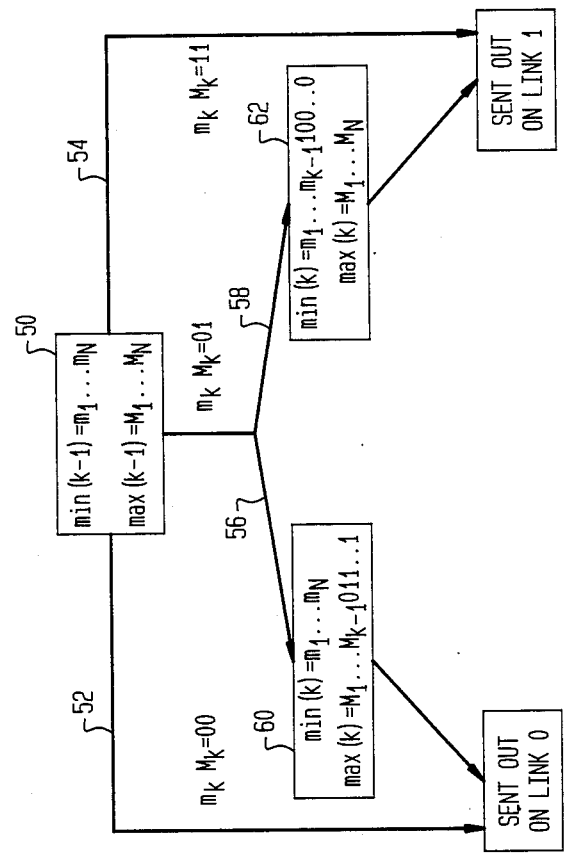
FIG. 5 is a flow chart of a Boolean Interval Splitting Algorithm in accordance with an illustrative embodiment of the invention.

FIG. 5 is a flow chart which schematically illustrates a Boolean Interval Splitting Algorithm which may be utilized by the nodes in a broadcast banyan network. An address interval is a set of contiguous N-bit binary numbers, which can be represented by two numbers, namely, a minimum and a maximum. In accordance with the Boolean Interval Splitting Algorithm, a node at stage k of an N stage broadcast banyan network receives a packet with a header containing an address interval specified by two binary numbers:

$$\max(k-1) = M_1 \ldots M_N \text{ and } \min(k-1) = m_1 \ldots m_N,$$

wherein k−1 denotes the previous stage in the network (see box 50 of the flow chart of FIG. 5).

Packets are routed as follows:

1. If $m_k = M_k = 0$ or $m_k = M_k = 1$, then transmit the packet via output "0" or "1", respectively (see branches 52 and 54 of the flow chart of FIG. 5).

2. If $m_k = 0$ and $M_k = 1$, then replicate the packet, modify the header according to the scheme described below and send the packet via both outputs. (See branches 56 and 58 in the flow chart of FIG. 5).

The modification of the packet header involves simply splitting the original address interval into two subintervals, which can be expressed by the following recursion formulas.

$$\min(k) = \min(k-1) = m_1 \ldots m_N$$

$$\max(k) = M_1 \ldots M_{k-1} \, 0 \, 1 \ldots 1$$

for the packet sent out on output "0" (see box 60 in the flowchart of FIG. 5) and, $$\min(k) = m_1 \ldots m_{k-1} \, 1 \, 0 \ldots 0$$

$$\max(k) = \max(k-1) = M_1 \ldots M_N$$

for the packet sent out on output "1" (see box 62 in the flowchart of FIG. 5). It should be noted that the sum of the two sub-intervals is equal to the original interval.

It is clear from the above rules that $m_i = M_i, i = 1, \ldots k-1$ for every packet arriving at stage k. It is also clear that $m_k = 1$ and $M_k = 0$ is impossible.

Figure 6:
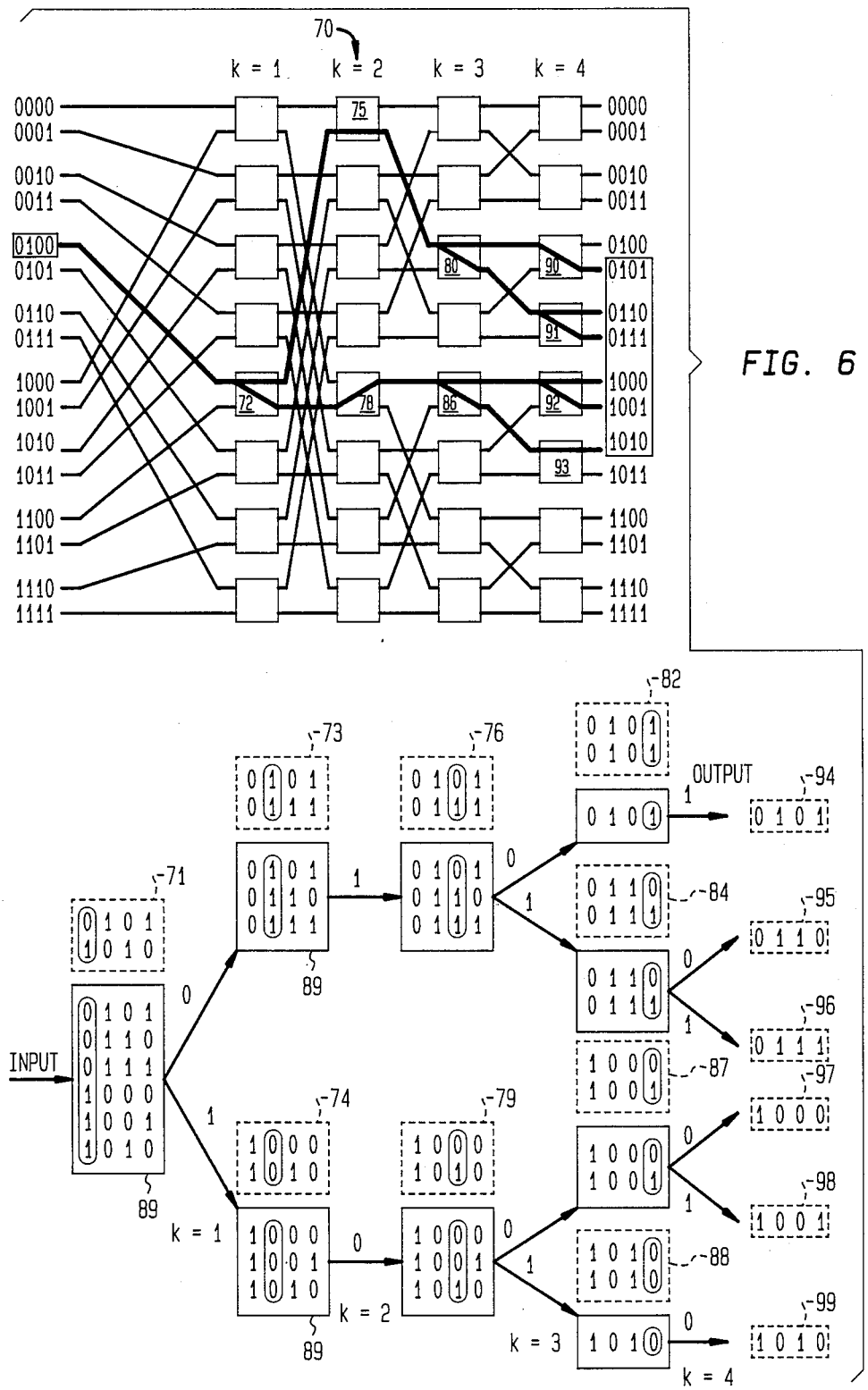
FIG. 6 schematically illustrates a banyan network for use in the copy network of FIG. 2 and whose nodes utilize the Boolean Interval Splitting Algorithm of the present invention, FIG. 7 schematically illustrates two running adder networks for use in the copy network of FIG. 2, FIG. 8 provides an example of packet copying in the copy network of the present invention, FIGS. 9 and 10 schematically illustrate concentrator networks for use in connection with the copy network of FIG. 2, and FIG. 11 schematically illustrates an expansion network in accordance with an illustrative embodiment of the present invention.

FIG. 6 illustrates the execution of the Boolean Interval Splitting Algorithm by a broadcast banyan network 70. Packets processed according to the Boolean Interval Splitting Algorithm are shown in phantom in FIG. 6.

Illustratively a packet 71 arrives on the input line bearing the address 0100. The packet header contains two addresses 0101 and 1010, which addresses are the minimum address and maximum address, respectively, of an address interval. This means that the packet is to be routed to all of the broadcast banyan network output addresses in the interval. The routing of the packet through the broadcast banyan network 70 is illustrated by heavy lines in FIG. 6. A copy of the packet is transmitted to every output address between the minimum output address 0101 and the maximum output address 1010.

For the packet 71 entering the node 72 in the stage $k = 1$ of the network 70, $m_1 = 0$, $M_1 = 1$. Thus packet replication takes places at the node 72 in stage $k = 1$.

A copy of the packet is transmitted from both outputs and the interval [0101, 1010] is split so that the packet 73 leaving on the upper or "0" output contains the subinterval [0101, 0111] and the packet 74 leaving on the lower or "1" output contains the subinterval [1000, 1010].

The packet 73 is processed in the $k = 2$ stage of the network 70 by the node 75. Since $m_2 = M_2 = 1$ in the packet 73, this packet is transmitted out of the node 75 on the lower or "1" output and there is no replication and corresponding header modification. Thus, the header of the packet 76 leaving the node 75 contains the subinterval [0101, 0111]. Similarly, the packet 74 is processed in the $k = 2$ stage by the node 78. Since $m_2 = M_2 = 0$ in the packet 74, this packet is transmitted out of the node 78 on the upper or "0" output with no replication and header modification. Thus, the header of the packet 79 leaving the node 78 contains the subinterval [1000, 1010].

In the $k = 3$ stage, the packet 76 is processed by the node 80. In the packet 76, $m_3 = 0$ and $M_3 = 1$. Thus, the packet 76 is replicated at the node 80 so that packet 82 leaves the node 80 via the "0" output and packet 84 leaves the node 80 via the "1" output. The sub-subinterval [0101, 0111] is split into two sub-sub-intervals so that packet 82 contains the sub-sub-interval [0101, 0101] (i.e. one address) and packet 84 contains the sub-sub-interval [0110, 0111]. Similarly, in the $k = 3$ stage, the packet 79 is processed by the node 86. In the case of the packet 79, $m_3 = 0$ and $M_3 = 1$ so that the packet 79 is replicated by the node 86. Thus, the packet 87 leaves the "0" output of the node 86 and the packet 88 leaves via the "1" output of the node 86. The sub-interval [1000,1010] is split into two sub-sub-intervals [1000, 1001] for the packet 87 and [1010, 1010] (i.e. one address) for the packet 88. The packets 82, 84, 87, 88 are then processed by the nodes 90, 91, 92 and 93, respectively, in the stage $k = 4$ of the banyan network 70 in accordance with the Boolean Interval Splitting Algorithm. The packet copies 94, 95, 96, 97, 98, 99 which emerge at the outputs of the banyan network, each contain only one address in their headers, namely, the banyan network output address on which the particular packet copy emerges. In this way the original packet 71 entering the network 70 is processed by the network 70 so that a copy of the packet 71 goes to every output address in the original address interval [0101, 1010].

For purposes of comparison, FIG. 6 shows how the generalized self-routing algorithm discussed above in Section 3 would be used to achieve the analogous result. As indicated in Section 3 above, the generalized self-routing algorithm processes explicit lists of addresses rather than address intervals. The packets 89 produced by the generalized self-routing algorithm are drawn with solid lines in FIG. 6 and are located underneath the corresponding packets (drawn with phantom lines) produced in accordance with the Boolean Interval Splitting Algorithm.

A broadcast banyan network which processes packets in accordance with the Boolean Interval Splitting Algorithm is non-blocking if the active inputs $x_1, \ldots, x_k$ and the corresponding sets of outputs $Y_1, \ldots, Y_k$ satisfy the following conditions 1. Monotone - If $x_1 < x_2 < \ldots < x_k$, then $y_1 < y_2 < \ldots y_k$, or $y_1 > y_2 > \ldots > y_k$ 2. Concentration - any input address between two active input addresses is also active. The inequality $Y_i < Y_j$ indicates that every output address in the set $Y_i$ is smaller than every output address in the set $Y_j$. As an example, a broadcast banyan network with active input addresses $x_1=7$, $x_2=8$, and $x_3=9$ and corresponding sets of output addresses $Y_1=\{1,3\}$, $Y_2=\{4,5,6\}$ and $Y_3=\{7,8,10,13,14\}$ is non-blocking.

4. Encoding Process

The basic architecture of the copy network has been described in Section 1 above and is schematically illustrated in FIG. 2. To review briefly, packet replications are accomplished by two fundamental processes, an encoding process and a decoding process. The encoding process transforms the set of copy numbers, specified in the headers of incoming packets, into a set of monotone address intervals which form new packet headers. This encoding process is carried out by a running adder network and a set of dummy address encoders. The decoding process performs the packet replications in a broadcast banyan network according to the Boolean Interval Splitting Algorithm described in Section 3. Finally, the destinations of packet copies emerging from the broadcast banyan network are determined by the trunk number translators.

Figure 7:
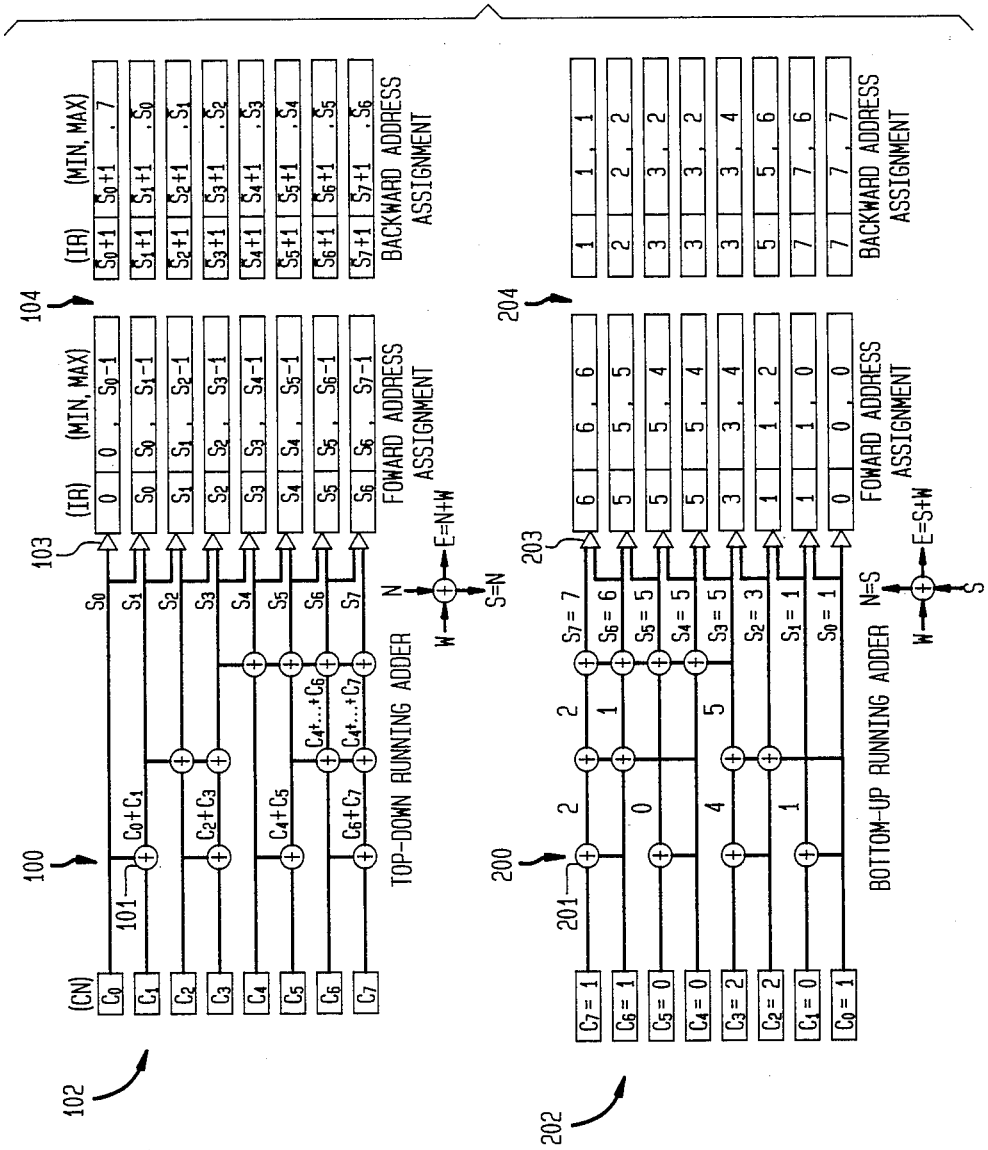

A running adder network is illustrated in FIG. 7.

The running adder network is a $\log_2 n$ stage network constructed from $n/2 \log_2 n$ nodes where n is the number of inputs. The running adder can be arranged as a top-down network 100 or as a bottom-up network 200 as illustrated in FIG. 7.

In the running adder networks of FIG. 7, each of the nodes is an adder having two inputs and two outputs. The two inputs are designated N and W and the two outputs are designed S and E. In the case of the top-down running adder network 100, the following relations hold at each node 101:

$$E = N + W$$

$$S = N$$

In the case of the bottom-up running adder network 200, the following relations hold at each node 201:

$$N = S$$

$$E = S + W$$

Thus, in the case of the top-down running adder network 100, packets 102 arrive at the inputs with copy numbers (CN) $C_0 \ldots C_7$ indicating the number of copies to be made of each packet. These copy numbers are summed by the nodes in the running adder network 100 so that $S_n = C_0 + \ldots + C_n$. Thus, for example, the sum $S_3$ is the sum of the copy numbers $C_0$, $C_1$, $C_2$ and $C_3$ and the sum $S_7$ is the sum of the copy numbers $C_0$, $C_1$, $C_2$, $\ldots, C_7$. Similarly, in the case of the bottom-up running adder network 200, the copy numbers in the packets 202 are summed so that $S_n = C_0 + \ldots + C_n$. Thus, for example, the sum $S_2 = C_0 + C_1 + C_2$ where $S_2 = 3$, $C_0 = 1$, $C_1 = 0$ and $C_2 = 2$.

The main function of the running adder network and dummy address encoders is to assign broadcast banyan network output addresses for each broadcast packet according to the requested number of copies as indicated by the copy number (CN) in the input packet headers. The running adder network generates the running sums of copy numbers $S_0, S_1 \ldots$ in the manner indicated above. The dummy address encoders 103, 203 then use the sums $S_0, S_1 \ldots$ to form the new packet headers. As shown in FIG. 7, the new packet headers 104, 204 comprise two fields, one field designates the output address interval (MIN, MAX), and the other field contains an index reference (IR) set equal to the minimum (MIN) of the address interval.

If the allocation of output addresses begins with address "0", then the following sequence of copy network output address intervals will be generated by the dummy address encoders.

$(0, S_0 - 1), (S_0, S_1 - 1), \ldots, (S_{n-2}, S_{n-1} - 1)$ where $S_i$ is the $i^{th}$ running sum of copy numbers. For example, the packet with copy number $C_3$ arriving on the fourth line from the top of the top-down running adder network 100 is converted to a packet whose index reference (IR) is $S_2$ and whose address interval is $S_2, S_3 - 1$. This sequence results in a forward address assignment.

Suppose $\bar{S}_i$ indicates the 1's complement of $S_i$ (e.g. the 1's complement of 0110 is 1001). Then the sequence $(\bar{S}_0 + 1, n-1), (\bar{S}_1 1, \bar{S}_0), \ldots (\bar{S}_{n-1}+1, \bar{S}_{n-2})$ allocates addresses starting from the bottom of the copy network outputs, a backwards address assignment. For example, in this address assignment scheme, the packet with the copy number $C_3$ arriving on the fourth line from the top of the top-down running adder network 100 is converted to a packet whose index reference (IR) is $\bar{S}_3 + 1$ and whose address interval is $\bar{S}_3 + 1, \bar{S}_2$.

The length of each address interval is equal to the corresponding copy number in both addressing schemes. It should also be noted that both sequences are monotone to satisfy the non-blocking condition discussed previously.

FIG. 7 shows the new packet headers 104 and 204 for both the top-down running adder network 100 and bottom-up running adder network 200. In each case, the forward address assignment scheme and the backwards address assignment scheme is illustrated. In case of the bottom-up running adder network 200, a numerical example is provided.

The structures of the top-down running adder network and bottom up running adder network are complementary to each other, which means both of them can be implemented on a single chip. Although only one adder network is needed to handle each set of simultaneous input packets, the other one can be a substitute. If only one running adder network is used, e.g., a top-down network, then the higher numbered inputs are more likely to overflow (i.e. have insufficient output addresses to assign) than the lowered number inputs. Furthermore, forwards or backwards address assignment tends to concentrate copy packets on one side, low or high, respectively, at the outputs of the broadcast banyan network. This may increase the overflow at the inputs of the succeeding point-to-point routing network. These problems may be alleviated by using dual running adder networks, a top-down network with forward address assignment, and a bottom-up network with backward address assignment. The two networks can be operated alternately on succeeding sets of simultaneous input packets.

To recapitulate briefly, the encoding process is carried out using a running adder network and dummy address encoders. The purpose of the encoding process is to transform the copy number (CN) in the header of each incoming packet into an address interval (MIN,MAX) and an index reference number (IR). The length of each address interval is equal to the corresponding copy number in the original packet header.

5. Decoding Process

The decoding process is carried out using the broadcast banyan network and the set of trunk number translators (elements 12 and 14 of FIG. 2). The purpose of the broadcast banyan network is to replicate an incoming packet and to route copies of the packet to the broadcast banyan network output addresses specified by the address interval in the packet header. As discussed above, packets are replicated in the broadcast banyan network in accordance with the Boolean Interval Splitting Algorithm.

When packets emerge from the broadcast banyan network, the address interval in each packet header contains only one address. As a result of processing according to the Boolean Interval Splitting Algorithm, this address is $$\min(N) = \max(N) = \text{output address}$$

The headers of packets leaving the broadcast banyan network also include an index reference (IR) and a broadcast channel number (BCN).

Packet copies having the same broadcast channel number (BCN) should be distinguished by a copy index (CI). Recall that the index reference (IR) is set equal to the minimum of the address interval in the header of the packet that initially enters the broadcast banyan network. The copy index (CI) of each packet is determined by $$\text{copy index} = \text{output address} - \text{index reference}$$

The function of the trunk number translators (14 of FIG. 2) is to assign a final destination address to each copy of a broadcast packet. As indicated above, broadcast banyan network output addresses are fictitious and used only for packet replication. The packet copies are routed to their final destination by the succeeding point-to-point routing network (5 of FIG. 1). Destination address assignments can be accomplished by a simple table look-up based on an identifier comprising the broadcast channel number (BCN) and the copy index (CI) associated with each packet. The trunk number translators contain tables with attributes BCN and CI as their primary keys. When a trunk number translator receives a copy of a broadcast packet, it first converts the output address and index reference (IR) into the copy index (CI) and then replaces the broadcast channel number (BCN) and copy index (CI) with the corresponding trunk number (TN) or destination address in the table (see FIG. 2). An alternative is trunk number selection. Suppose the BCN field contains a list of all trunk numbers or destination addresses belonging to the broadcast channel. The copy index can then be used as a pointer to select one of the trunk numbers or destination addresses in the list and to erase the rest. The number of copies and destinations of a broadcast channel may change frequently during a connection. Updating this information is fairly easy with both schemes. After a destination address is provided for each packet leaving the copy network, the point-to-point routing network (e.g. network 5 of FIG. 1) is used to route the packet copies to their destinations.

6. Illustrative Example

Figure 8:
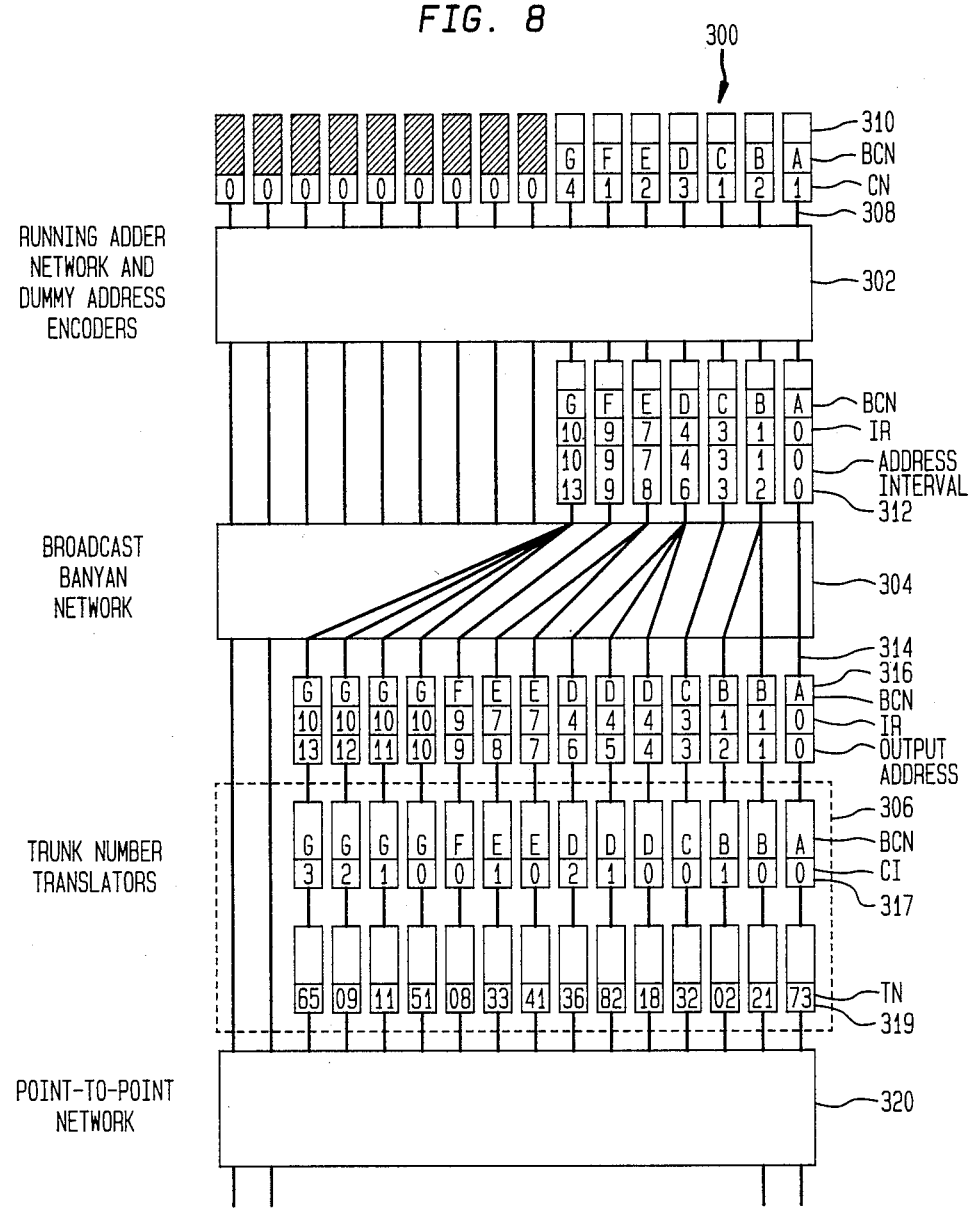

FIG. 8 shows, by way of an illustrative example, how the copy network of the present invention can simultaneously replicate a plurality of input packets in a non-blocking fashion.

The copy network 300 of FIG. 8 comprises running adder network and dummy address encoders 302, a broadcast banyan network 304, and trunk number translators 306. Packets to be copied arrive at the inputs 308 to the copy network 300. In this example, the first seven inputs receive active packets 310 while the remaining inputs are inactive. Each of the active packets has a header which includes a copy number (CN), indicating how many copies of the packet are required and a broadcast channel number (BCN).

The running adder network and dummy address encoders 302 transform the copy number (CN) in each packet into an address interval, defined by a minimum address (MIN) and a maximum address (MAX), and an index reference (IR) which is equal to the minimum (MIN) of the address interval. Thus, each packet 312 entering the broadcast banyan network 304 has a header which comprises an address interval, an index reference, and a broadcast channel number.

In the example of FIG. 8, the running adder network is a top-down running adder network and the address assignment is forward. In this case, the interval is given by the formula $(0, S_0-1)$, $(S_0, S_1-1)$ . . . $(S_{n-2}, S_{n-1}-1)$. Thus, for example, the packet whose BCN=D and whose CN=3 receives an index reference (IR) of 4 and an address interval [4, 6] which means that broadcast banyan network output addresses 4,5,6 receive copies of this packet.

As previously indicated, a broadcast banyan network is non-blocking if for each active input $x_i < x_j$, the corresponding sets of output addresses $Y_i$ and $Y_j$ are such that every address in the set $Y_i$ is smaller than every address in the set $Y_j$. Thus, the output addresses are assigned to intervals monotonically. A second condition for non-blocking is that there be no inactive input between two active inputs. This second condition is known as the concentration condition.

Both of these conditions for non-blocking are met in the illustrative example of FIG. 8. First, the output address intervals are assigned monotonically to corresponding inputs so that the first condition for a non-blocking network is met. In addition, there are no inactive inputs between active inputs.

The packets 312 are processed by the broadcast banyan network in accordance with the Boolean Interval Splitting Algorithm discussed above. Copies of the packets 312 emerge from the broadcast banyan network 304 at the particular outputs 314 set forth in the address intervals in the headers of the packets 312. The header of each packet 316 leaving the broadcast banyan network includes its banyan network output address (resulting from use of the Boolean Interval Splitting Algorithm), an index reference (IR) and a broadcast channel number (BCN). As indicated by packets 317, the Trunk Number Translators 306 first utilize the output address and index reference to calculate a copy index (CI) according to the formula $$\text{copy index (CI)} = \text{output address} - \text{index reference (IR)}.$$

The copy index and broadcast channel number are then used by the Trunk Number Translators 306 to provide an outgoing trunk number (TN) as indicated by the packets 319. The point-to-point routing network 320 is then used to route the packets 319 to the destination address indicated by the trunk number in the packet headers.

7. Networks with Concentration

As indicated above, to satisfy the non-blocking condition in the broadcast banyan network, there can be no inactive inputs between active inputs. In order to eliminate such inactive inputs, it is desirable to use a concentrator network.

Figure 9:
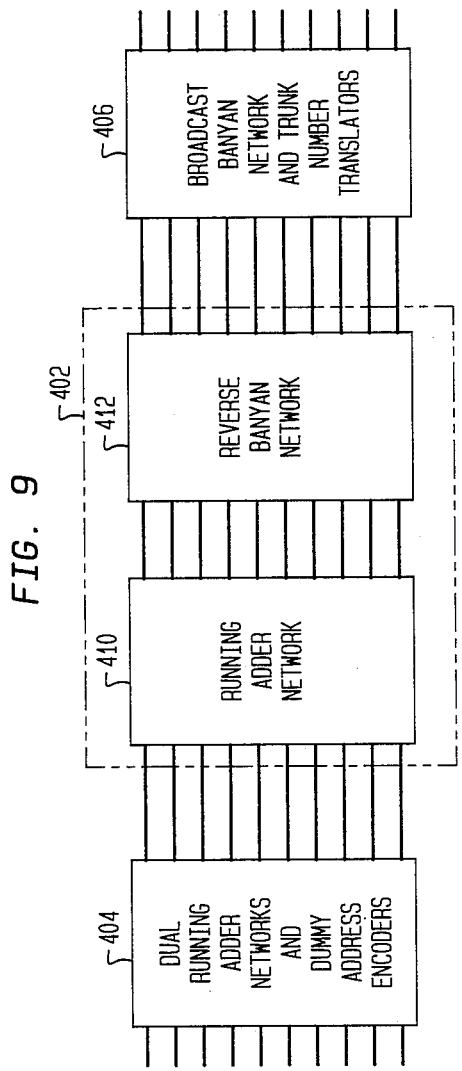

A copy network including a concentrator network is schematically illustrated in FIG. 9. Illustratively a concentrator network 402 is located between the running adder network and dummy address encoders 404 and the broadcast banyan network and trunk number translators 406. In this case the concentrator network 402 itself comprises a running adder network 410 followed by a reverse banyan network 412. The running adder network 410 in the concentrator network 402 computes a routing address by counting the total number of active packets above each of its lines by summing activity bits in the headers of the active packets. The reverse banyan network routes the active packets based on the sums of the activity bits so that all of the packets will emerge contiguously at the outputs of the reverse banyan network. It should be noticed that fairness for inputs and arbitration for outputs may be best achieved when the running adder network and dummy address encoders 404 comprises dual running adder networks.

An alternative approach to concentration involves priority sorting. The top-down (or bottom-up) running adder network used in the copy network of the present invention allocates output addresses to the input packets starting from the top (or bottom) of the input lines. This top-down (or bottom-up) prioritization is an intrinsic property of the running adder network. To cope with this property, the incoming packets can be sorted according to a priority index and an activity bit contained in the packet headers by a Batcher sorting network. (See, e.g. Batcher, K. E. "Sorting Networks and Their Applications," AFIPS Proceedings of the Spring Joint Computer Conference, 1968, 307-314). A lower index means higher priority. The Batcher sorting network sorts the packets so that the active packets emerge monotonically with respect to their priorities at the outputs of the sorting network.

Figure 10:
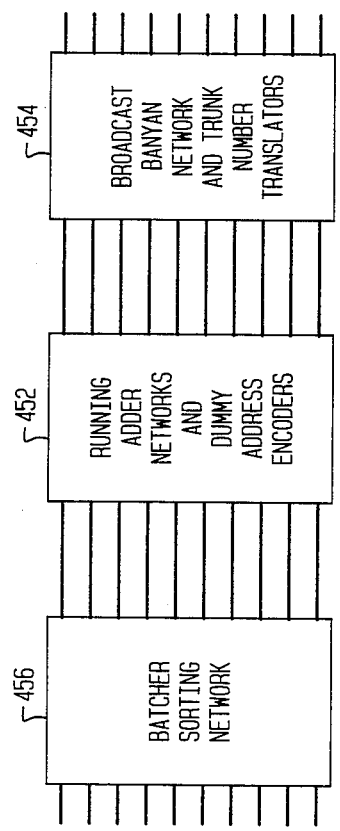

FIG. 10 illustrates a copy network comprising a running adder network and dummy address encoders 452 and broadcast banyan network and trunk number translators 454. A batcher sorting network 456 is located in front of the running adder network for sorting and concentrating input packets according to a priority index.

8. Expansion Networks

Figure 11:
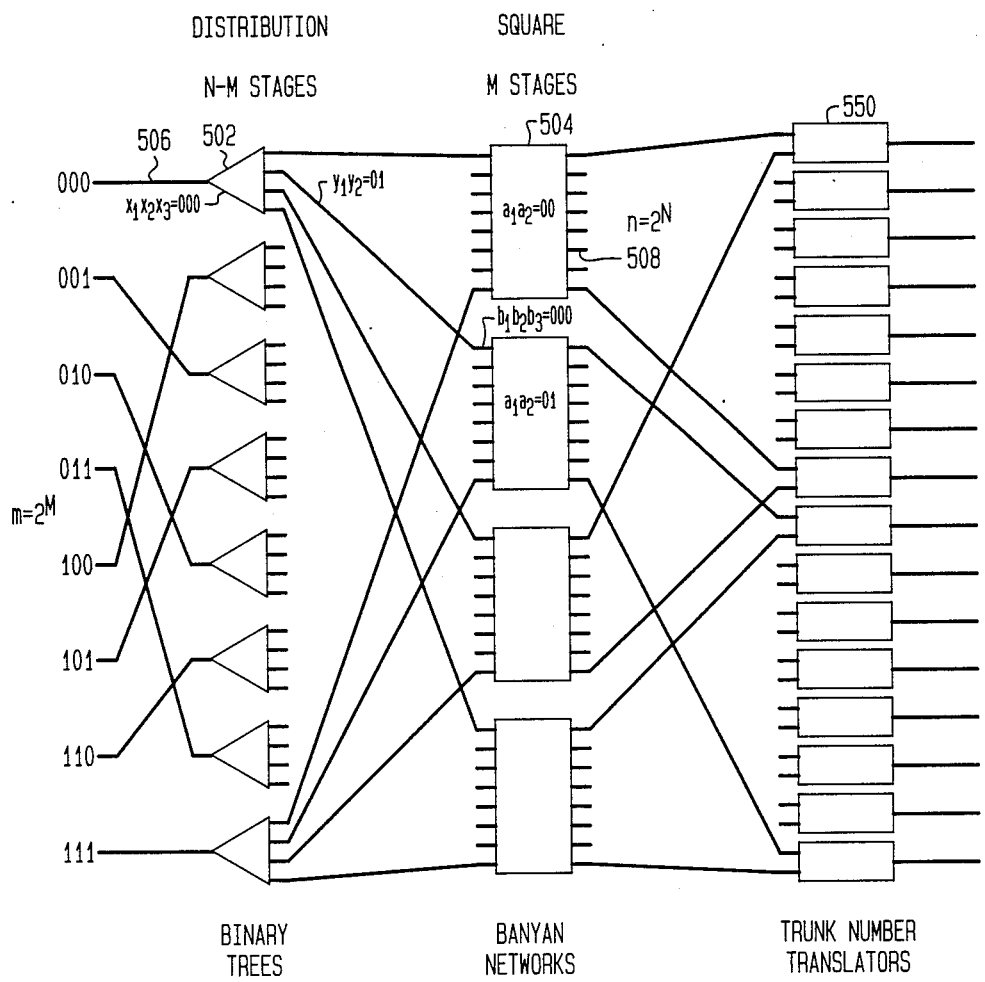

Packet replication is a divergent branching process. Accordingly, a non-square network (i.e., a network wherein the number of outputs does not equal, and is larger than, the number of inputs) is appropriate for packet replication in many broadcasting applications such as entertainment video. FIG. 11 schematically illustrates an N-stage expansion network 500 with $m=2^M$ inputs and $n=2^N$ outputs. The network 500 comprises a set of $2M$ binary tree networks 502 with each binary tree network 502 having N-M stages. The network 500 also includes a set of $2N-M$ square banyan networks 504, with each banyan network 504 having M stages. The network 500 of FIG. 11 has eight inputs 506 and thirty-two outputs 508. It should also be noticed that the perfect shuffle of the inputs to a square banyan network (see FIG. 3, 4, 5 and discussion in Sec. 2 above) is replaced by the perfect shuffle of inputs to the binary trees 502.

The binary tree networks 502 are made up of switch node elements with one input and two outputs. These nodes execute the Boolean Interval Splitting Algorithm discussed above. Each input line 506 is expanded to $2^{N-M}$ lines by the associated (N-M) stage binary tree network 502 to achieve a desired expansion ratio. The remaining M stages of the network 500 comprise square banyan networks 504.

The interconnection of the $2^M$ binary trees 502 and $2^{N-M}$ square banyan networks 504 may be understood as follows. The outputs of a binary tree 502 may be uniquely identified by a 2-tuple $(x_1 \ldots x_M, y_1 \ldots y_{N-M})$, where $x_1 \ldots x_M$ is the top down numbering of the binary trees and $y_1 \ldots y_{N-M}$ is the local address of each output within a particular binary tree. Each input of one of the banyan networks can also be identified by a 2-tuple $(a_1 \ldots a_{N-M}, b_1 \ldots b_M)$ where $a_1 \ldots a_{N-M}$ is the top down numbering of the banyan network and $b_1 \ldots b_M$ is the local address of the individual banyan network input. The binary tree outputs and banyan network inputs are interconnected according to the following scheme: two ports $(x_1 \ldots x_M, y_1 \ldots y_{N-M})$ and $(a_1 \ldots a_{N-M}, b_1 \ldots b_M)$ are connected by a link if $(x_1 \ldots x_M, y_1 \ldots y_{N-M}) = (b_1 \ldots b_M, a_1 \ldots a_{N-M})$. Thus, for example, as shown in FIG. 11, binary tree output port $x_1 x_2 x_3 = 000$, $y_1 y_2 = 01$ is connected to the banyan network input port $a_1 a_2 = 01$, $b_1 b_2 b_3 = 000$.

The outputs of the expansion network 500 can be multiplexed into trunk number translators 550 as shown in FIG. 11. This reduces the overflow probability of a copy network incorporating the broadcast network 500 of FIG. 11. Furthermore, the expansion network 500 of FIG. 11 is non-blocking if the output addresses are assigned to input packets in a monotone fashion and the active inputs are concentrated. As discussed in Section 4 above, these same criteria for non-blocking are applicable to a square (i.e. nxn) banyan network whose nodes execute the Boolean Interval Splitting Algorithm.

CONCLUSION

A non-blocking, self-routing, constant latency copy network for use in multicast packet switch has been disclosed. The main function of the copy network is packet replication, which is realized by cascaded encoding and decoding processes.

The encoding process is carried out by a running adder network and a set of dummy address encoders, which generate dummy address intervals as new packet headers for incoming packets. Then, a broadcast banyan network decodes these address intervals according to a Boolean Interval Splitting Algorithm to replicate the packets. At each node of the broadcast banyan network, the decision concerning whether or not to replicate a packet is based on two bits in the packet header taken from the address interval information contained therein. In order for the broadcast banyan network to be non-blocking, output address intervals should be assigned to inputs in a monotone fashion and the inputs should be concentrated. Because the broadcast banyan network is non-blocking, the individual switching nodes do not require a packet buffering capability.

Packets leaving the broadcast banyan network are assigned actual destination addresses using trunk number translators. For some broadcast applications, such as entertainment video, a non-square expansion network may be utilized for packet replication.

Finally, the above described embodiments of the invention are intended to be illustrative only. Numerous alternative embodiments may be devised by those skilled in the art without departing from the spirit and scope of the following claims.

What is claimed is:

1. A copy network for copying data packets comprising:
    encoding means for converting copy numbers in the headers of incoming packets into address intervals, and
    decoding means for replicating said packets by routing said packets to the addresses contained in the intervals.

2. The network of claim 1 wherein said encoding means comprises a running adder network and dummy address encoders.

3. The network of claim 2 wherein said decoding means comprises a banyan network whose nodes are capable of packet replication.

4. A copy network for copying data packets comprising:
    means for providing running sums of copy numbers contained in the headers of data packets arriving at said copy network,
    means for utilizing said running sums to provide the header of each packet with an address interval, and
    means for replicating said packets including a network for routing said packets to the addresses contained in said intervals.

5. The network of claim 4 wherein said means for providing said sums is a top-down adder network.

6. The network of claim 4 wherein said means for providing said sums is as bottom-up adder network.

7. The copy network of claim 4 wherein said means for providing said sums comprises a top-down running adder network and a bottom-up running adder network.

8. The copy network of claim 4 wherein said means for utilizing said sums comprises a set of encoders.

9. The copy network of claim 4 wherein said replicating means includes a network having the topology of a banyan network.

10. The copy network of claim 4 wherein said replicating means includes a banyan network whose nodes are capable of packet replication.

11. The copy network of claim 9 wherein said replicating means comprises a plurality of binary tree networks and a plurality of square banyan networks.

12. A copy network for simultaneously providing copies of a plurality of data packets comprising
    means for transforming a set of copy numbers specified in the headers of said data packets into a set of monotone address intervals which form new packet headers, and
    packet replication means including an array of interconnected identical nodes capable of replicating packets in accordance with information contained in said address interval.

13. The copy network of claim 12 wherein said network further includes trunk number translators located at the output of said packet replication means.

14. A copy network for copying data packets comprising
    a running adder network for providing running sums of copy numbers specified in the headers of incoming packets,
    a set of dummy address encoders for utilizing said sums to provide each of said packets with an address interval, each of said address intervals containing a number of addresses equal to the original copy number,
    a broadcast network for replicating said packets by routing said packets to the addresses contained in said intervals, and
    translator means located at the outputs of said broadcast network for providing packets leaving said broadcast network with destination addresses.

15. The copy network of claim 14 wherein said broadcast network is a banyan network.

16. The copy network of claim 14 wherein said broadcast network comprises a plurality of binary tree networks and a plurality of square banyan networks.

17. The copy network of claim 14 wherein said copy network includes a Batcher sorting network located at the inputs to said running adder network.

18. The copy network of claim 14 further including a concentrator network for insuring that there are no inactive inputs between two active inputs of said broadcast network.

19. The copy network of claim 18 wherein said concentrator network is located at the inputs of said broadcast network.

20. A copy network for providing copies of data packets comprising:
    means for transforming a set of copy numbers specified in the headers of said data packets into a set of monotone broadcast network output address intervals which form new data packet headers, and
    a broadcast network for replicating said packets by routing each packet to the broadcast network output addresses contained in its associated interval.

21. The copy network of claim 20 wherein said broadcast network is a broadcast banyan network.

22. A copy network for copying data packets comprising,
    means for providing data packets whose headers include address intervals, and
    a network for replicating said packets by routing each packet to the addresses contained in its associated interval.

23. The copy network of claim 22 wherein said replicating network comprises:
    $2^M$ inputs,
    $2^N$ outputs,
    $2^M$ binary tree networks, each of said binary tree networks having N-M stages, and
    $2^{N-M}$ square banyan networks, each of said banyan networks having M stages.

24. A copy network for copying data packets comprising:
    means for providing data packets whose headers include address intervals, and
    packet replication means including an array of interconnected nodes capable of replicating packets by utilizing information provided by said address intervals.

25. A method for copying data packets comprising the steps of:
    converting copy numbers in the headers of incoming packets into address intervals, and
    replicating said packets by routing said packets through a network whose nodes are capable of packet replication to the addresses contained in said intervals.

26. A method for copying data packets comprising the steps of:
   providing running sums of copy numbers contained in the headers of arriving packets,
   utilizing said running sums to provide the header of each packet with an address interval, and
   replicating said packets by routing said packets through a network whose nodes are capable of packet replication to the addresses contained in said intervals.

27. The method of claim 26 wherein said replicating step comprises routing said packets through a banyan network.

28. A method for simultaneously copying a plurality of data packets comprising the steps of:
   transforming a set of copy numbers specified in the headers of said data packets into a set of monotone address intervals which form new packet headers, and
   replicating said packets in an array of interconnected nodes by utilizing the information provided by said address intervals.

29. The method of claim 28 wherein said method further comprises the step of:
   providing each packet resulting from said replicating step with a trunk number or destination address.

30. A method for copying data packets comprising:
   providing running sums of copy numbers specified in the headers of incoming packets,
   utilizing said running sums to provide each packet with an address interval, each address interval containing a number of addresses equal to the original copy number,
   replicating said packets by routing said packets through a network whose nodes are capable of packet replication to the addresses specified in the intervals, and
   providing packets leaving said replication network with destination addresses.

31. A method for copying data packets comprising the steps of:
   transforming a set of copy numbers specified in the headers of said data packets into a set of monotone broadcast network output address intervals which form new packet headers, and
   routing said packets through a broadcast network capable of replicating said packets to the broadcast network output addresses contained in the new packet headers.

32. A method for copying data packets comprising the steps of:
   providing data packets whose headers include address intervals, and
   routing said packets through a network having nodes capable of utilizing the information provided by the address intervals to replicate said packets.

33. A method for routing a data packet through a node in the $k^{th}$ stage of a network comprising an array of interconnected nodes organized into N stages, said nodes having logic "0" and logic "1" outputs, said packet having a header including a minimum binary number $m_1 \ldots m_N$ and a maximum binary number $M_1 \ldots M_N$ which together define an interval, said method comprising the steps of:
   if $m_k = M_k$, transmitting said packet out said logic "0" or said logic "1" output and if $m_k = M_k$, transmitting a first copy of said packet out said logic "0" output with a header including the interval $[m_1 \ldots M_N, M_1 \ldots M_{k-1}011 \ldots 1]$ and transmitting a second copy of said packet out said logic "1" output with a header including the interval $[m_1 \ldots m_{k-1}10 \ldots 0, M_1 \ldots M_N]$.

34. The method of claim 33 wherein said intervals contain output addresses of said network.

35. A method for selectively replicating a data packet comprising the steps of
   receiving a packet whose header includes an address interval defined by a minimum address and a maximum address, said packet being received at a node in the $k^{th}$ stage of a network comprising a plurality of interconnected nodes organized into N stages,
   if the $k^{th}$ bit in the minimum address is equal to the $k^{th}$ bit in the maximum address, transmitting said received packet out from said node via a first or second output of said node, and
   if the $k^{th}$ bit in the minimum address is not equal to the $k^{th}$ bit in the maximum address, transmitting the packet out via the first and second output of said node and modifying the headers of the transmitted packets so that the header of each transmitted packet includes a portion only of said address interval defined by said minimum address and said maximum address.

* * * * *

UNITED STATES PATENT AND TRADEMARK OFFICE
CERTIFICATE OF CORRECTION

PATENT NO. : 4,813,038

DATED : March 14, 1989

INVENTOR(S) : Tony T. Lee

It is certified that error appears in the above-identified patent and that said Letters Patent is hereby corrected as shown below:

Column 9, line 30, "n/2og$_2$n" should read -- n/2log$_2$n --
Column 18, line 22, "m$_1$...M$_n$" should read -- m$_1$...m$_N$ --

Signed and Sealed this

Seventh Day of August, 1990

*Attest:*

HARRY F. MANBECK, JR.

*Attesting Officer*  *Commissioner of Patents and Trademarks*